United States Patent
Yanagita et al.

(10) Patent No.: US 8,912,977 B2
(45) Date of Patent: Dec. 16, 2014

(54) PROJECTOR, PROJECTOR SYSTEM, AND IMAGE CORRECTING METHOD

(75) Inventors: Yoshiho Yanagita, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 13/638,349

(22) PCT Filed: Mar. 29, 2011

(86) PCT No.: PCT/JP2011/057778
§ 371 (c)(1),
(2), (4) Date: Nov. 8, 2012

(87) PCT Pub. No.: WO2011/122612
PCT Pub. Date: Oct. 6, 2011

(65) Prior Publication Data
US 2013/0057596 A1 Mar. 7, 2013

(30) Foreign Application Priority Data

Mar. 31, 2010 (JP) ................................. 2010-080761

(51) Int. Cl.
| | |
|---|---|
| *G09G 5/00* | (2006.01) |
| *H04N 9/31* | (2006.01) |
| *G03B 17/54* | (2006.01) |
| *G03B 21/14* | (2006.01) |
| *G03B 21/00* | (2006.01) |
| *G03B 21/56* | (2006.01) |

(52) U.S. Cl.
CPC .............. *G03B 17/54* (2013.01); *H04N 9/3185* (2013.01); *H04N 9/3147* (2013.01); *H04N 9/3194* (2013.01); *H04N 9/3129* (2013.01); *G03B 21/14* (2013.01); *G03B 21/00* (2013.01); *G03B 21/56* (2013.01)
USPC ............. 345/1.1; 345/1.3; 348/383; 348/745; 353/69; 353/70

(58) Field of Classification Search
USPC .......... 345/204, 1.1–3.4; 353/30, 70, 122, 69; 348/189, 191, 383, 745
See application file for complete search history.

(56) References Cited

U.S. PATENT DOCUMENTS 6,771,307 B2 * 8/2004 Waki et al. ..................... 348/189
6,804,406 B1 * 10/2004 Chen .............................. 382/254
(Continued)

FOREIGN PATENT DOCUMENTS

| JP | 64-88531 A | 4/1989 |
| JP | 2-109032 A | 4/1990 |

(Continued)

OTHER PUBLICATIONS

The international search report for PCT/JP2011/057778 mailed on Apr. 26, 2011.

(Continued)

*Primary Examiner* — Jennifer Nguyen
(74) *Attorney, Agent, or Firm* — Sughrue Mion, PLLC

(57) ABSTRACT

A projector that can solve a problem in which a projection image is disturbed due to deviation of incident positions of projection light to a screen is provided. Projection section 11 includes LD light emission section 111 and scanning section 112 that scans light emitted by LD light emission section 111 and projects the scanned light to the rear plane side of the screen. Control section 12 controls an amount of light emission of the light and a scanning angle of scanning section 112 based on an image signal so as to cause projection section 11 to project an image corresponding to the image signal to the screen. Control section 12 corrects an orientation of projection light corresponding to each pixel of the image projected from projection section 11 based on a refractive index of the light transmission member and a scanning angle of scanning section 112 so as to correct an incident position of the projection light on the screen.

8 Claims, 17 Drawing Sheets

(56) References Cited

U.S. PATENT DOCUMENTS

| | | | |
|---|---|---|---|
| 7,443,586 B2 * | 10/2008 | Yang et al. | 359/558 |
| 7,724,205 B2 * | 5/2010 | Inazumi | 345/1.3 |
| 2009/0251753 A1 | 10/2009 | Hirakawa et al. | |

FOREIGN PATENT DOCUMENTS

| | | |
|---|---|---|
| JP | 2-134677 A | 5/1990 |
| JP | 2-278976 A | 11/1990 |
| JP | 7-59035 A | 3/1995 |
| JP | 11249237 A | 9/1999 |
| JP | 2006145797 A | 6/2006 |
| JP | 2009015125 A | 1/2009 |
| JP | 2009265614 A | 11/2009 |

OTHER PUBLICATIONS

Japanese Office Action for JP Application No. 2013-203742 mailed on Jun. 17, 2014 with partial English Translation.

* cited by examiner

PROJECTOR, PROJECTOR SYSTEM, AND IMAGE CORRECTING METHOD

TECHNICAL FIELD

The present invention relates to a projector, a projector system, and an image correcting method.

BACKGROUND ART

A multi-projector system having a plurality of projectors that are arranged in an array and that project a large composite image on a screen is known. Since such a multi-projector system displays a large image, the system needs to have a large screen to some extent. Thus, support members that support the screen may be located on the rear plane of the screen so as to prevent it from becoming slack.

If the foregoing multi-projector system uses rear projectors that project light to the rear plane of the screen, the support member will be located at the boundaries of projection regions of the projectors so as to prevent the support members from shading light and shadowing a projection image. However, if the support members are located at the boundaries of projection regions of the projectors, since the support members shade the boundaries of the projection images of the projectors, the boundaries of the projection images of the projectors will be disturbed.

A technique that solves the foregoing problem is disclosed in Patent Literature 1 that describes a multi-projector device. In the multi-projector system, joint portions of the support members and a screen are composed of light transmission members. Thus, since light emission passes through the light transmission members of the joint portions of the support members, the boundaries of projection images do not deteriorate the composite image.

RELATED ART LITERATURE

Patent Literature

Patent Literature 1: JP 11-249237A, Publication

SUMMARY OF THE INVENTION

Problem to be Solved by the Invention

In the multi-projector device described in Patent Literature 1, since light that enters the light transmission member of the support member is refracted, the incident light deviates from the incident position of the incident light that does not pass through the transmission member of the support member, and therefore the projection image is distorted.

An object of the present invention is to provide a projector, a projector system, and an image correcting method that can solve the problem of distortion of projection images due to deviation of incident positions of projection light at the boundaries on the screen.

Means that Solve the Problem

A projector according to the present invention is a projector that projects light to a rear plane side of a screen having a screen support member composed of a light transmission member located on the rear plane of the screen, including:

a projection section that includes a light source and a scanning section that scans emission light of said light source and projects the scanned light to said rear plane side of said screen;

a drive section that controls an amount of light emission of said light and a scanning angle of said scanning section based on an image signal so as to cause said projection section to project an image corresponding to said image signal to said screen; and a correction section that corrects an orientation of projection light corresponding to each pixel of said image projected from said projection section based on a refractive index of said light transmission member and a scanning angle of said scanning section so as to correct an incident position of the projection light on said screen.

A projector system according to the present invention includes:

a plurality of the foregoing projectors, wherein the projectors are arranged such that projection images of the projectors are arranged and displayed in an array on said screen.

An image correcting method according to the present invention is an image correcting method using a projector that has a projection section including a light source and a scanning section that scans light emitted by said light source and projects the scanned light to a rear plane side of a screen having a screen support member composed of a light transmission member located on the rear plane of the screen, including:

controlling an amount of light emitted by said light and a scanning angle of said scanning section based on an image signal so as to cause said projection section to project an image corresponding to said image signal to said screen; and calibrating an orientation of projection light corresponding to each pixel of said image projected from said projection section based on the refractive index of said light transmission member and the scanning angle of said scanning section so as to correct an incident position of the projection light on said screen.

Effect of the Invention

According to the present invention, distortion of projection images due to deviation of incident positions of projection light at boundaries on a screen can be alleviated.

BEST MODES THAT CARRY OUT THE INVENTION

Figure 1:
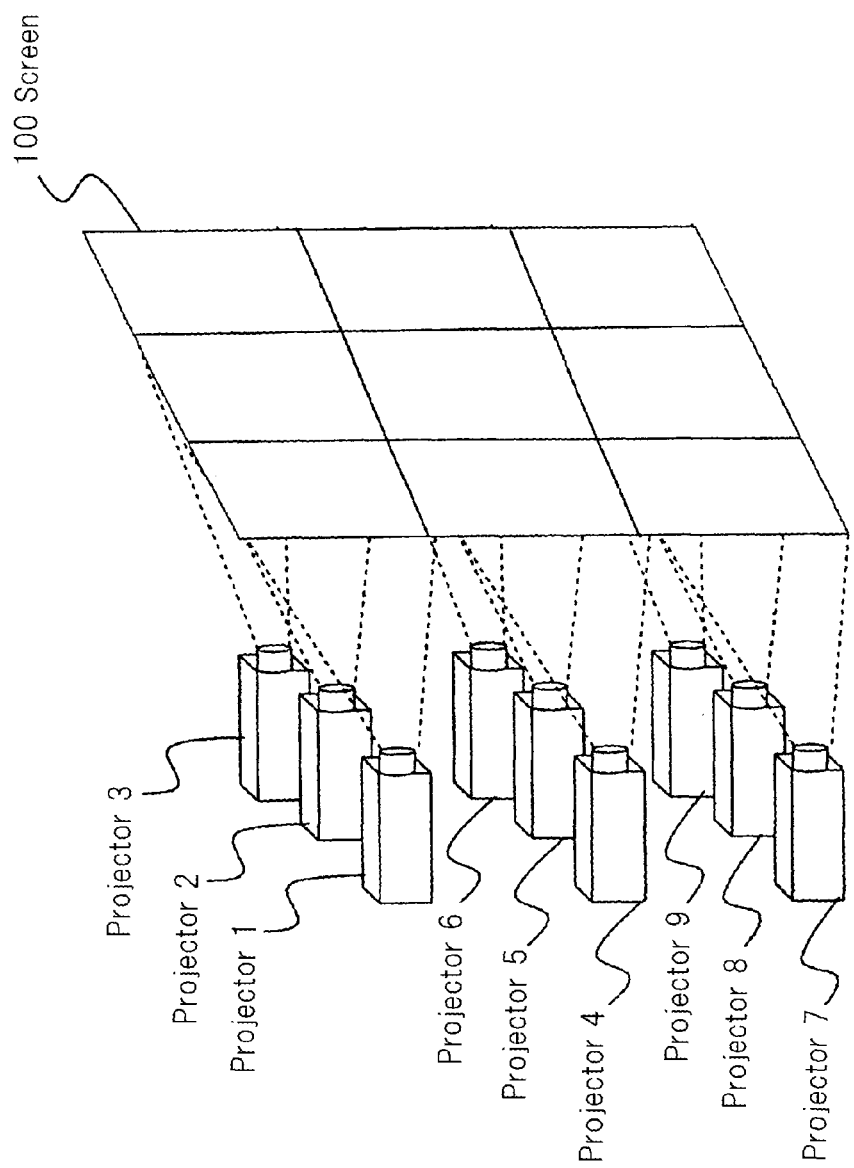
FIG. 1 is a schematic diagram showing a multi-projector system according to a first embodiment of the present invention.

Next, with reference to the accompanying drawings, embodiments of the present invention will be described. In the following description, similar functional structures are denoted by similar reference numerals and their redundant description may be omitted.

FIG. 1 is a schematic diagram showing a multi-projector system according to a first embodiment of the present invention. In FIG. 1, the multi-projector system has projectors 1 to 9 and screen 100. Although FIG. 1 shows nine projectors, the number of projectors is not limited to nine, but two or more. Screen 100 may be located independent from the multi-projector system.

Figure 2:
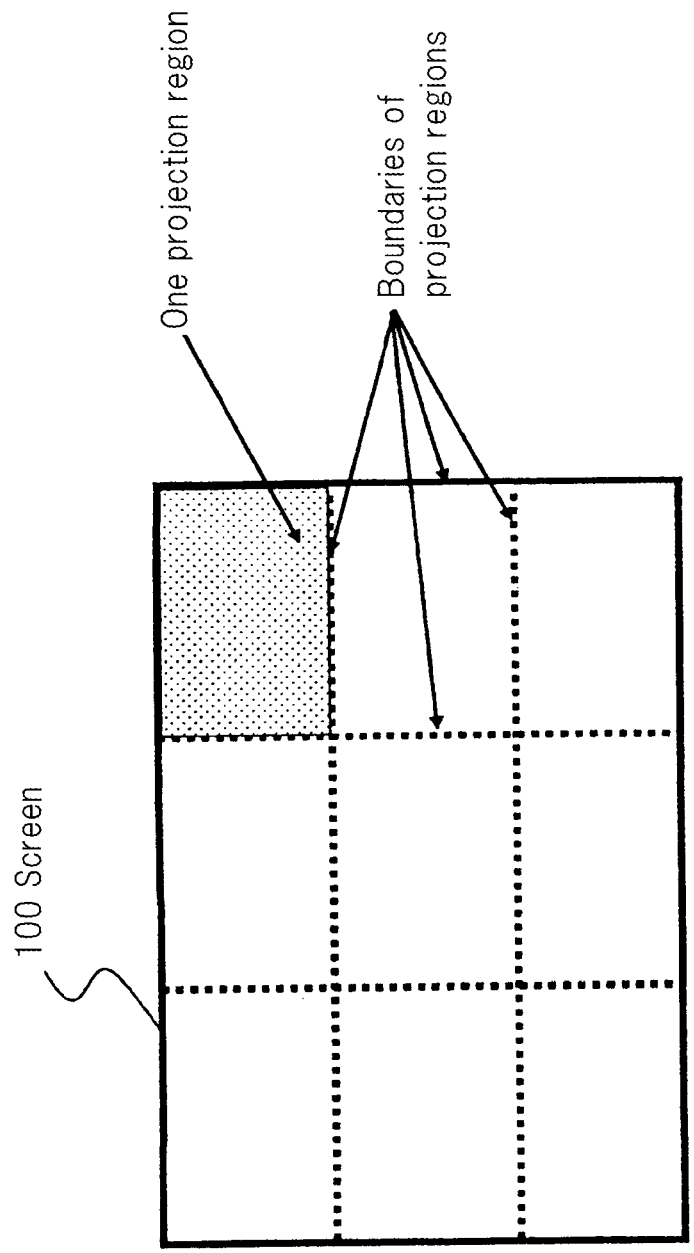
FIG. 2 is a schematic diagram showing projection regions of individual projectors provided in a multi-projector system.

Projectors 1 to 9 are rear-projectors that emit light to the rear plane of screen 100 so as to project an image from screen 100. Projection regions of projectors 1 to 9 are arranged and displayed in an array as shown in FIG. 2. Thus, projection images of projectors 1 to 9 are arranged and displayed in an array on screen 100.

Screen 100 is of rear screen type. Screen support members that support screen 100 are located on the rear plane of screen 100.

Figure 3:
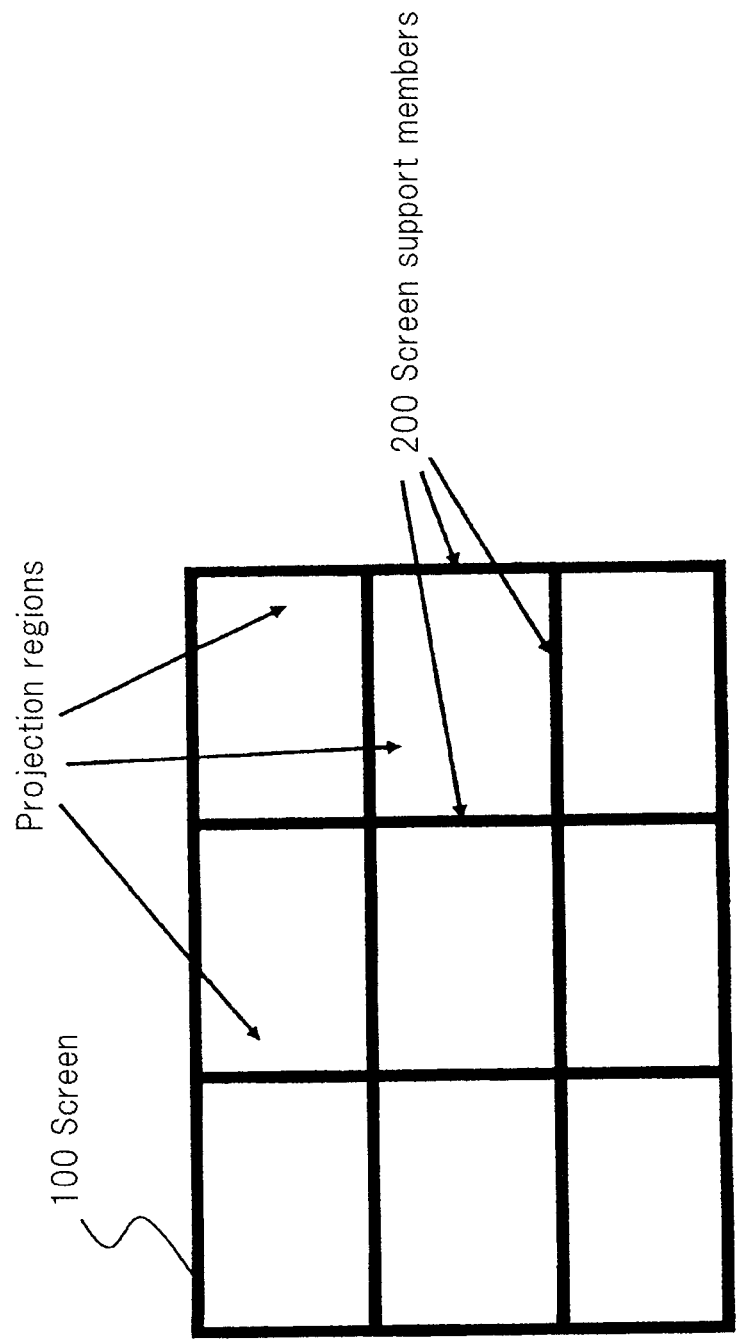
FIG. 3 is a rear view showing a screen.

FIG. 3 is a rear view of screen 100. As shown in FIG. 3, screen support members 200 are located at the boundaries of projection regions of projectors 1 to 9. According to this embodiment, it is assumed that the boundaries of projection regions extend in the horizontal and vertical directions.

As shown in FIG. 3, screen support members 200 are located on all the boundaries of projection images of projectors 1 to 9. Alternatively, screen support members 200 may be located on part of the boundaries of projection images of projectors 1 to 9 as long as screen 100 can be supported with sufficient strength to prevent it from slacking.

Figure 4:
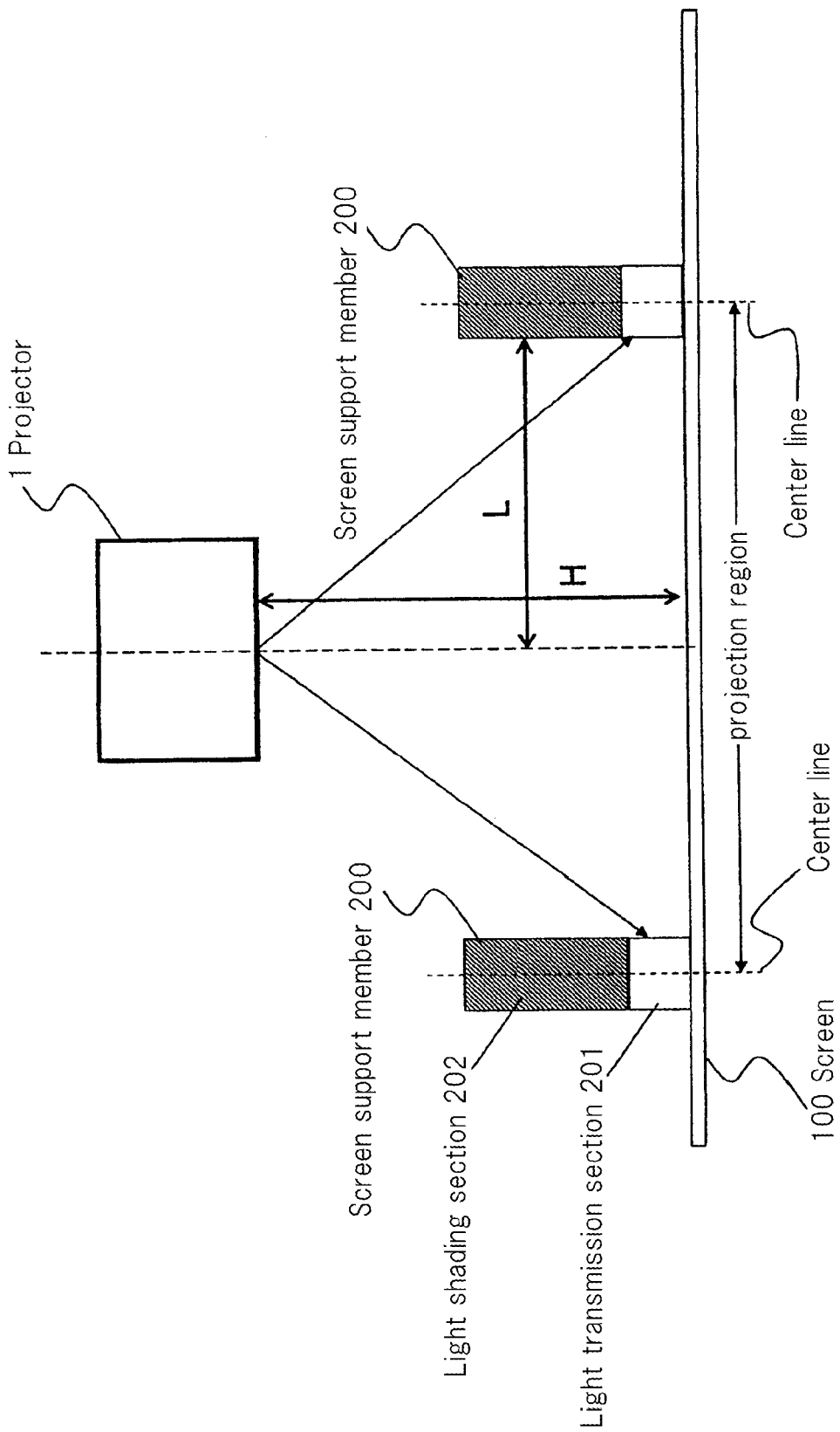
FIG. 4 is a transverse sectional view showing a projection region of a projector provided in the multi-projector system, the projection region being viewed from a side plane of the multi-projector system.

FIG. 4 is a transverse sectional view showing a projection region of projector 1 provided in the multi-projector system, the projection region being viewed from a side plane of the multi-projector system.

As shown in FIG. 4, screen support members 200 are connected to screen 100 such that the boundary of a projection region of projector 1 matches the center of screen support member 200. Screen support member 200 has light transmission section 201 and light shading section 202.

Light transmission section 201 is connected to screen 100. Light transmission section 201 is composed of a light transmission member through which light transmits. According to this embodiment, screen support members 200 are located perpendicular to screen 100. A side plane of light transmission section 201 is orthogonal to the front surface of screen 100.

Light shading section 202 is located on light transmission section 201. Light shading section 202 may be composed of a light shading member that shades light. Alternatively, light shading section 202 may have a structure in which a light shading film that shades light is formed on the front surface of a light transmission member.

It is desirable that height h of light transmission section 201 be decided such that projection light of projector 1 is transmitted through light transmission section 201 and reaches the boundary of a projection region, but does not enter the projection region of another projector.

Figure 5:
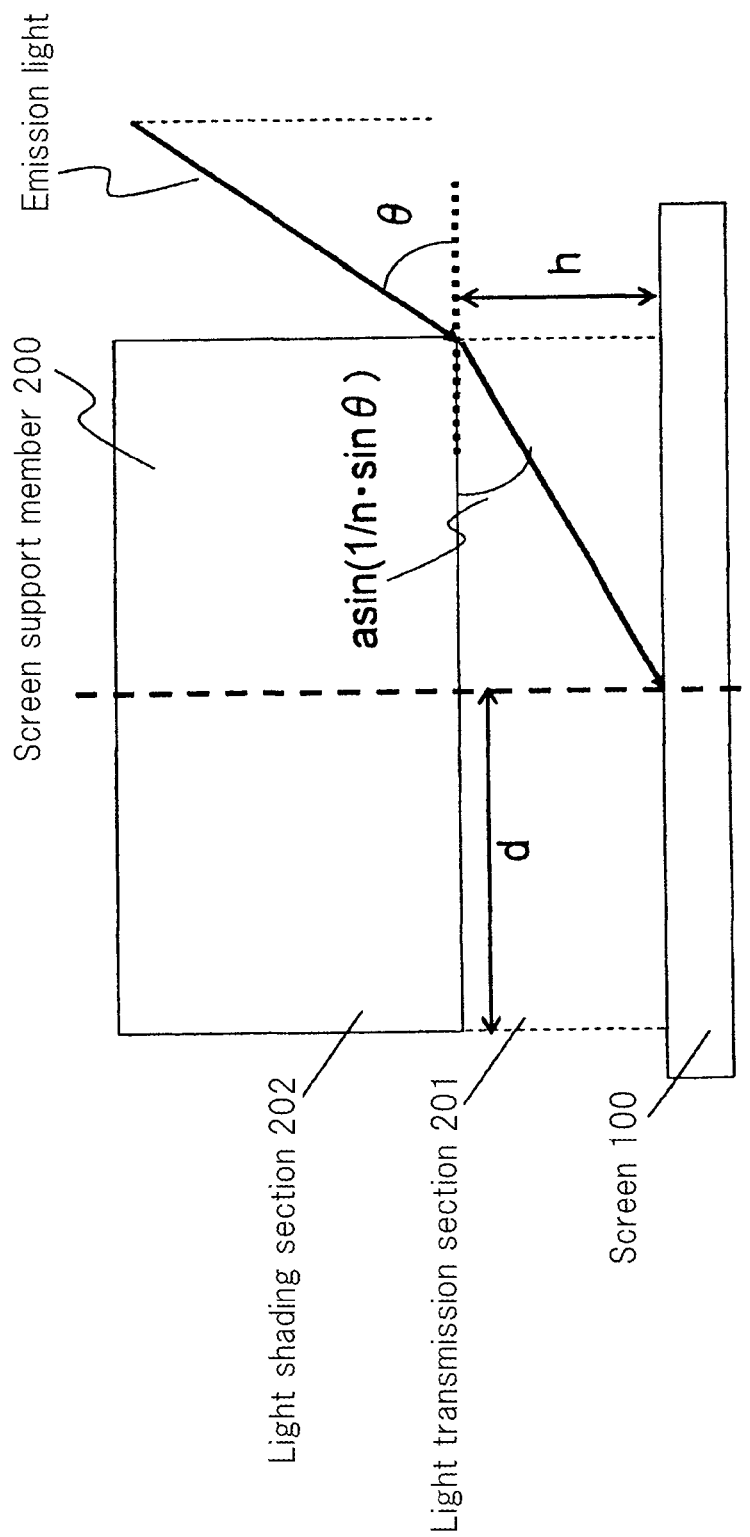
FIG. 5 is a schematic diagram describing the height of a light transmission section.

FIG. 5 is a schematic diagram describing height h of light transmission section 201. As shown in FIG. 5, height h of light transmission section 201 for which projection light reaches the boundary of a projection region, not the projection region of another projector can be expressed by the following Formula 1.

$$h = d \cdot \tan(a \sin(1/n \cdot \sin \theta))$$ [Formula 1]

where the refractive index of light transmission section 201 is denoted by n; and the width of light transmission section 201 is denoted by 2d. Auxiliary angle θ can be expressed as θ=90°−β where β is the projection angle of projection light. According to this embodiment, auxiliary angle θ is a critical incident angle that is the incident angle of projection light to light transmission section 201 when the projection light reaches the boundary of a projection region.

In this case, assuming that refractive index n of light transmission section 201 is 1.4, width 2d of light transmission section 201 is 100 mm, and critical incident angle θ is 60°, height h of light transmission section 201 becomes 39 mm.

Next, the relationship of light transmission section 201 and distortion of an image will be described.

Figure 6:
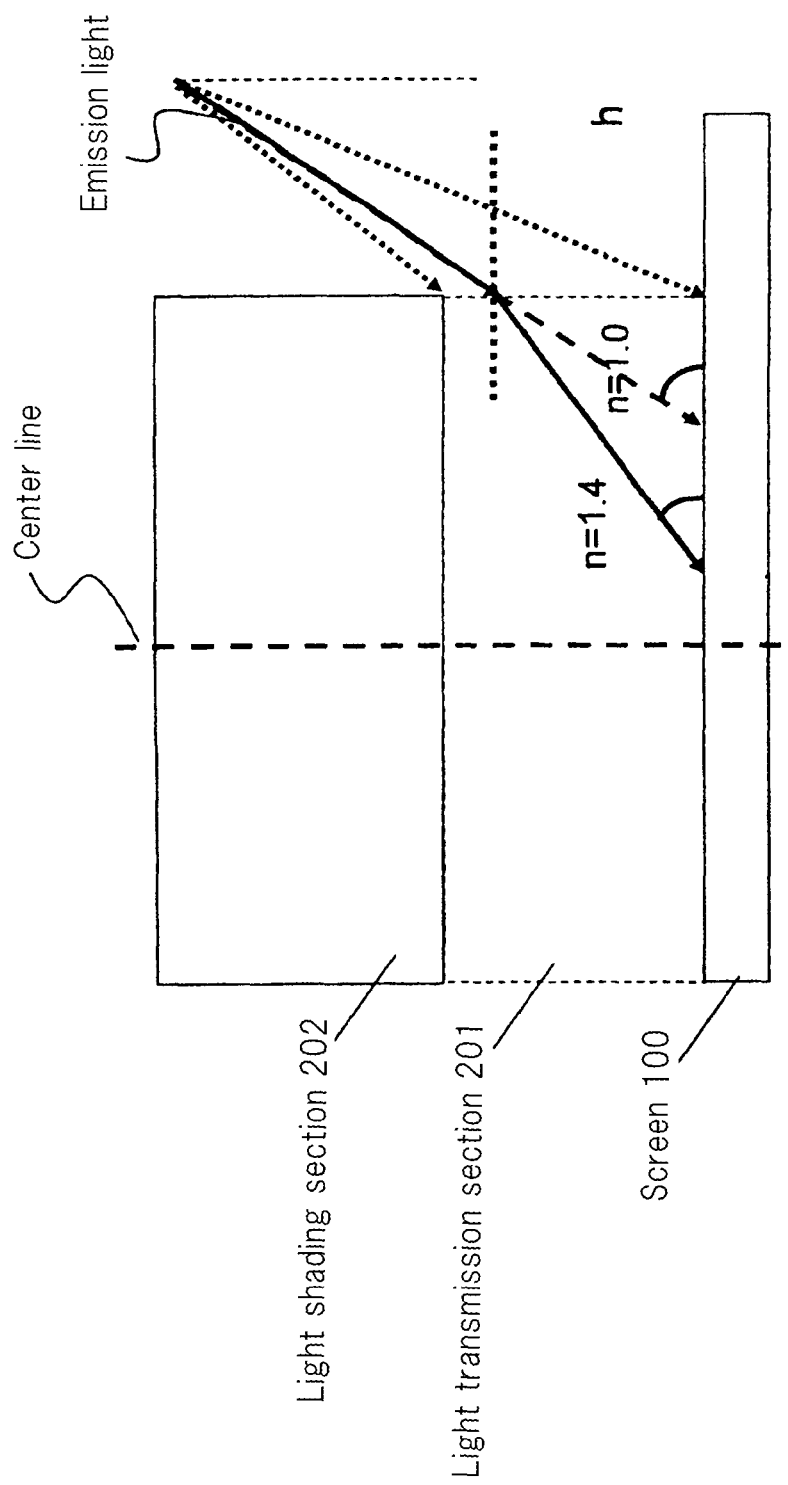
FIG. 6 is a schematic diagram showing an example of a screen support member.
Figure 7:
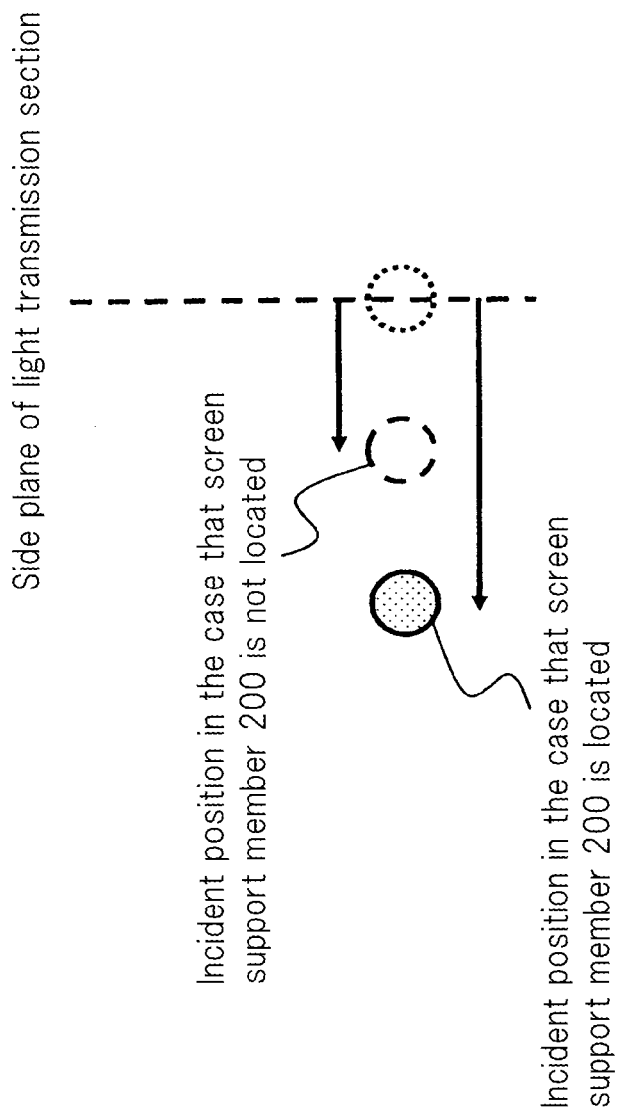
FIG. 7 is a schematic diagram showing an incident position of emission light on the screen.

FIG. 6 and FIG. 7 are schematic diagrams describing the relationship of light transmission section 201 and distortion of an image. FIG. 6 is a side view showing the neighborhood of screen support member 200 provided in the multi-projector system. FIG. 7 is a schematic diagram showing the incident position of projection light emitted from projector 1 on screen 100, the incident position being viewed from the rear plane of screen 100. In FIG. 6 and FIG. 7, it is assumed that refractive index n of light transmission section 201 is 1.4.

Next, the case in which projection light of projector 1 is transmitted through light transmission section 201 of screen support member 200 and enters screen 100 will be described. In this case, as shown in FIG. 6 and FIG. 7, when projection light of projector 1 enters light transmission section 201, the projection light is refracted. Thus, the incident position of incident light on screen 100 deviates from that in the case in which screen support member 200 is not present (refractive index n=1.0). Thus, the projection light is distorted.

Figure 8:
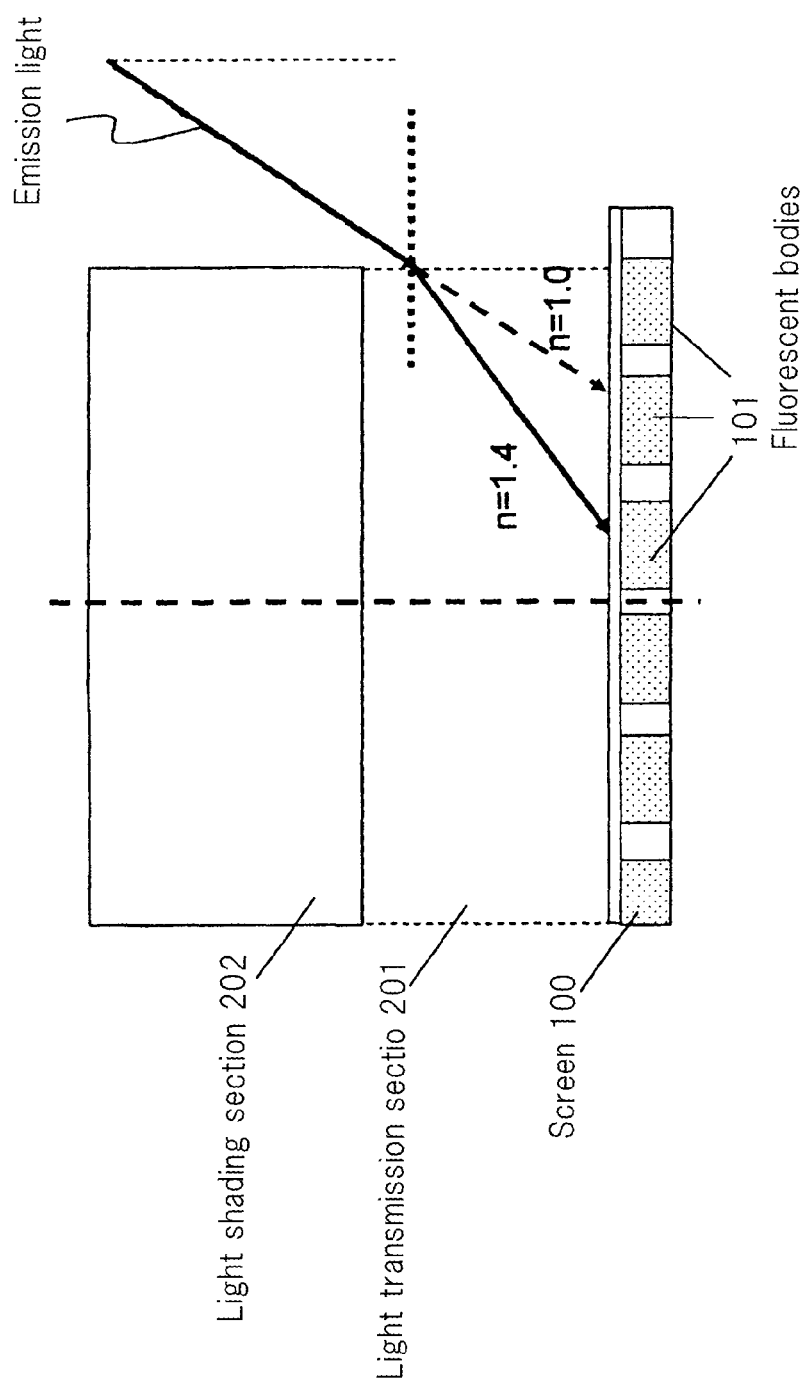
FIG. 8 is a transverse sectional view showing the neighborhood of the screen support member in the multi-projector system in the case in which the screen is a fluorescent screen.

For example, the case in which screen 100 is a fluorescent screen will be considered. FIG. 8 is a transverse sectional view showing the neighborhood of the screen support member in the case in which screen 100 is a fluorescent screen.

As shown in FIG. 8, a plurality of fluorescent bodies 101 that emit fluorescent light of different wavelength bands corresponding to incident light are arranged on the fluorescent screen. For example, fluorescent bodies 101 of three types that emit fluorescent light having wave length bands corresponding to red, blue and green are arranged alternately on the fluorescent screen. Fluorescent bodies 101 are arranged with a gap therebetween.

In the case in which screen 100 is the fluorescent screen shown in FIG. 8, if the incident position of projection light on screen 100 deviates from that in the case in which no screen support member 200 is present, projection light may enter an incorrect position (another fluorescent body or a gap between fluorescent bodies). In this case, the projection image may not have the expected brightness or color and thereby the projection image may be distorted.

Next, the structure of projectors 1 to 9 will be described. Since projectors 1 to 9 have the same structure, the structure of projector 1 will be exemplified.

Figure 9:
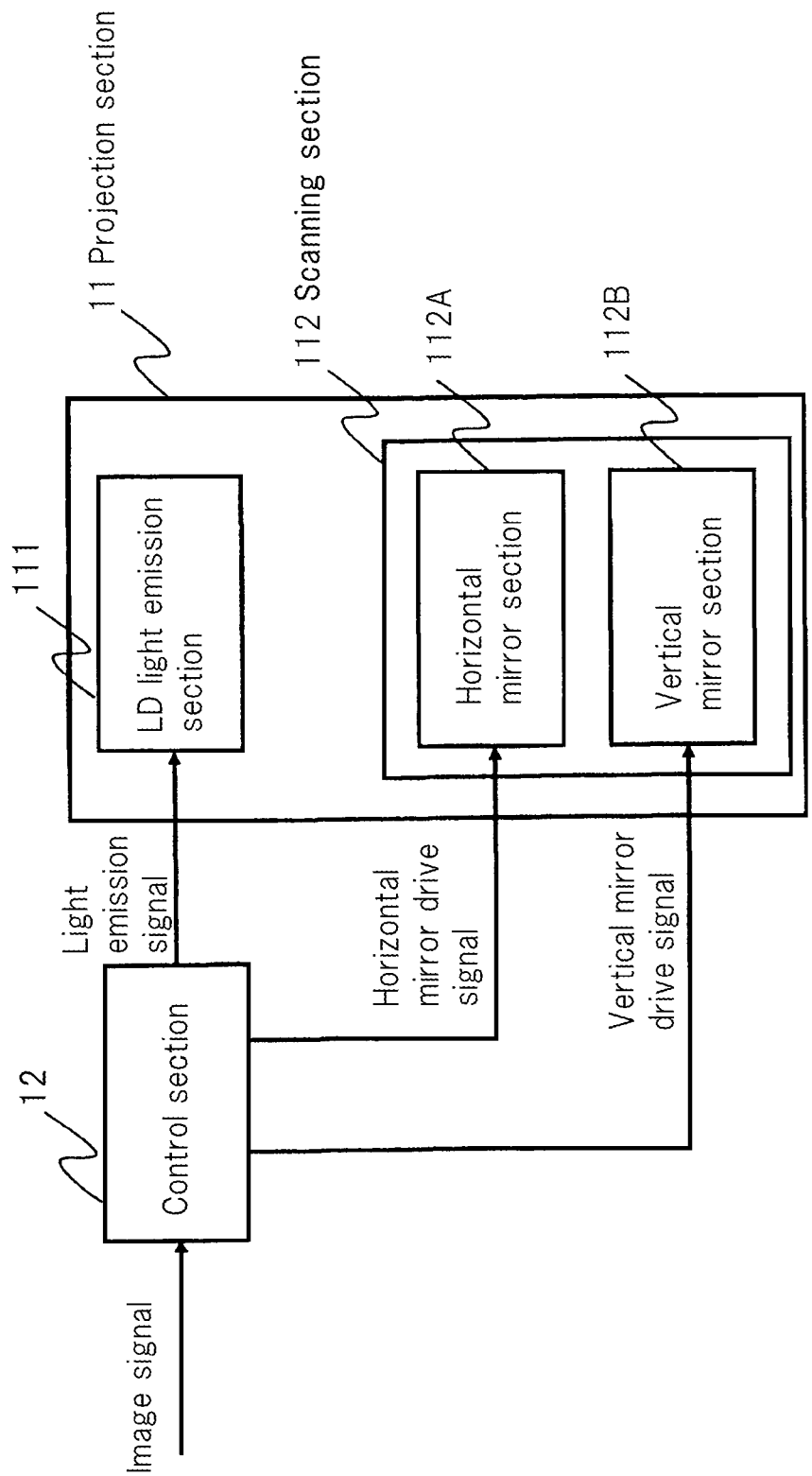
FIG. 9 is a block diagram showing an example of the structure of the projector.

FIG. 9 is a block diagram showing an example of the structure of projector 1. In FIG. 9, projector 1 has projection section 11 and control section 12.

Projection section 11 projects light to the rear plane of screen 100. More specifically, projection section 11 has LD light emission section 111 and scanning section 112 that have the following functions.

LD light emission section 111 is a light source using an LD (Laser Diode). LD light emission section 111 emits light to scanning section 112.

Scanning section 112 scans light emitted by LD light emission section 111 in two directions, that are horizontal and vertical directions, and projects the scanned light to screen 100. According to this embodiment, a first scanning direction and a second scanning direction that are different from each other correspond to the horizontal direction and vertical direction, respectively.

Scanning section 112 has horizontal mirror section 112A and vertical mirror section 112B. Horizontal mirror section 112A scans light emitted by LD light emission section 111 in the horizontal direction and emits the scanned light. Vertical mirror section 112B scans the light emitted by horizontal mirror section 112A in the vertical direction and projects the scanned light to the rear plane of screen 100.

An image signal is input to control section 12. Control section 12 controls projection section 11 based on the input image signal and causes projection section 11 to project the image to screen 100.

Figure 10:
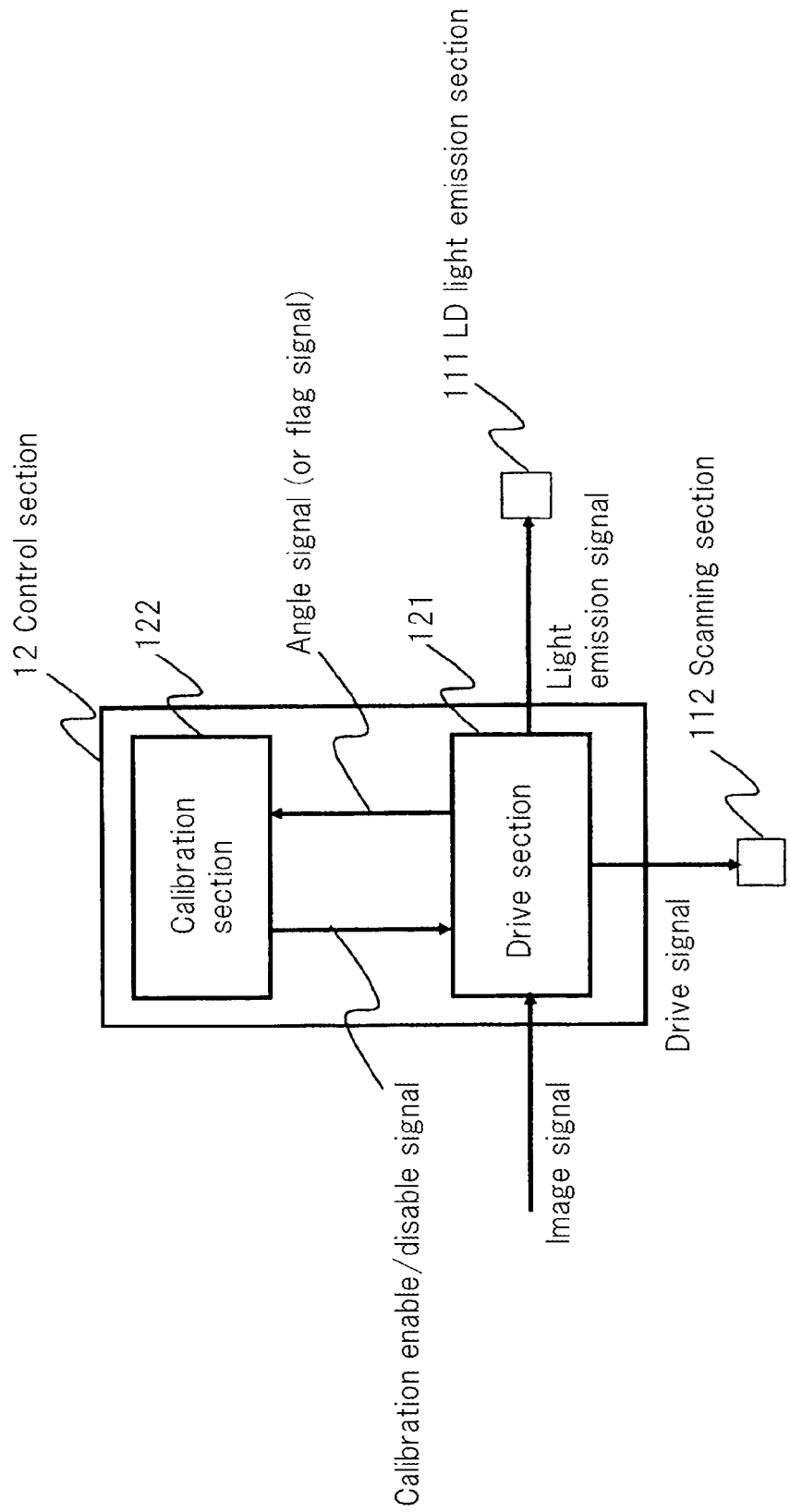
FIG. 10 is a block diagram showing an example of the structure of a control section.

FIG. 10 is a block diagram showing an example of the structure of control section 12. In FIG. 10, control section 12 has drive section 121 and correction section 122.

An image signal is input to drive section 121. Based on the input image signal, drive section 121 generates a light emission signal that controls LD light emission section 111 and a drive signal that controls scanning section 112.

The light emission signal represents a light emission voltage command value corresponding to the amount of light emitted by LD light emission section 111 for each pixel of a projection image (hereinafter referred to as emission light of each pixel). The amount of light emitted by each pixel is represented by the intensity and emission time of light emitted by each pixel.

On the other hand, the drive signal represents a drive voltage that changes the scanning angle of scanning section 112 and the scanning angular speed that is the rate of change of the scanning angle. More specifically, the drive signal is composed of a horizontal mirror drive signal that represents a horizontal mirror drive voltage command value that changes a horizontal scanning angle that is the scanning angle of horizontal mirror section 112A and a horizontal scanning angular speed that is the rate of change of the horizontal scanning angle; and a vertical mirror drive signal that represents a vertical mirror drive voltage command value that changes a vertical scanning angle that is the scanning angle of vertical mirror section 112B and a vertical scanning angular speed that is the rate of change of the vertical scanning angle. The horizontal scanning angle is an example of a first scanning angle, whereas the vertical scanning angle is an example of a second scanning angle. The vertical scanning angular speed is an example of a scanning angular speed in the second scanning direction.

Drive section 121 inputs the light emission signal to LD light emission section 111 so as to control the amount of light emitted by LD light emission section 111 based on the image signal.

In addition, drive section 121 inputs the horizontal mirror drive signal to horizontal mirror section 112A and the vertical mirror drive signal to vertical mirror section 112B so as to control the scanning angle of scanning section 112 that corresponds to the image signal.

Figure 11:
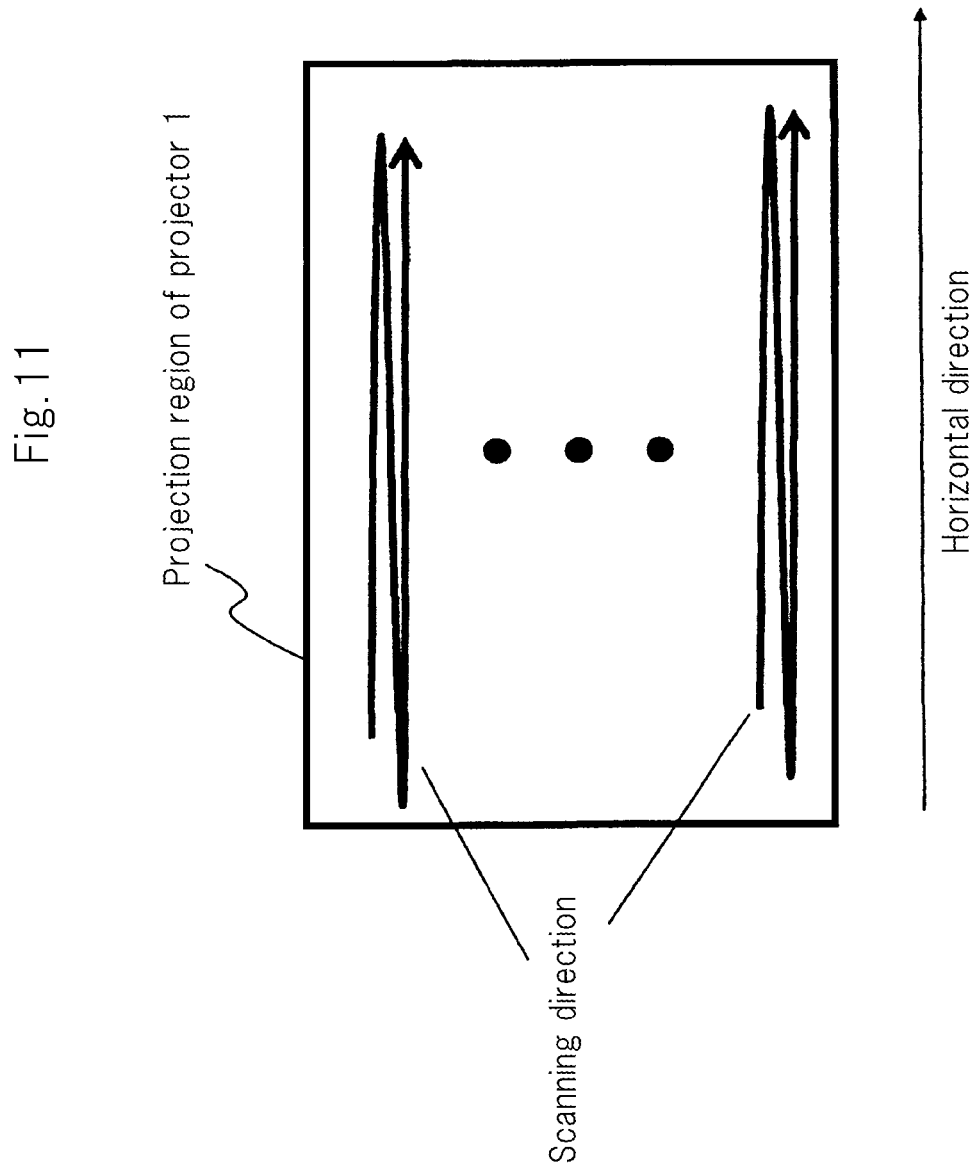
FIG. 11 is a schematic diagram describing a scanning direction.

As shown in FIG. 11, the drive section 121 controls scanning section 112 so as to scan emission light for each line of the image in the horizontal direction.

Correction section 122 corrects the projection angle (orientation) of projection light corresponding to each pixel of the projection image of projection section 11 (hereinafter referred to as projection light of each pixel) based on the refractive index of light transmission section 201 of screen support member 200 and the scanning angle of scanning section 112 so as to correct the incident position of projection light of each pixel on screen 100.

More specifically, correction section 122 performs a horizontal correction process that corrects the emission time of light emitted by each pixel and thereby the projection angle of projection light of each pixel and the vertical correction process that corrects the vertical scanning angular speed of scanning section 112 and thereby the projection angle of projection light of each pixel.

First, the horizontal correction process will be described.

Figure 12:
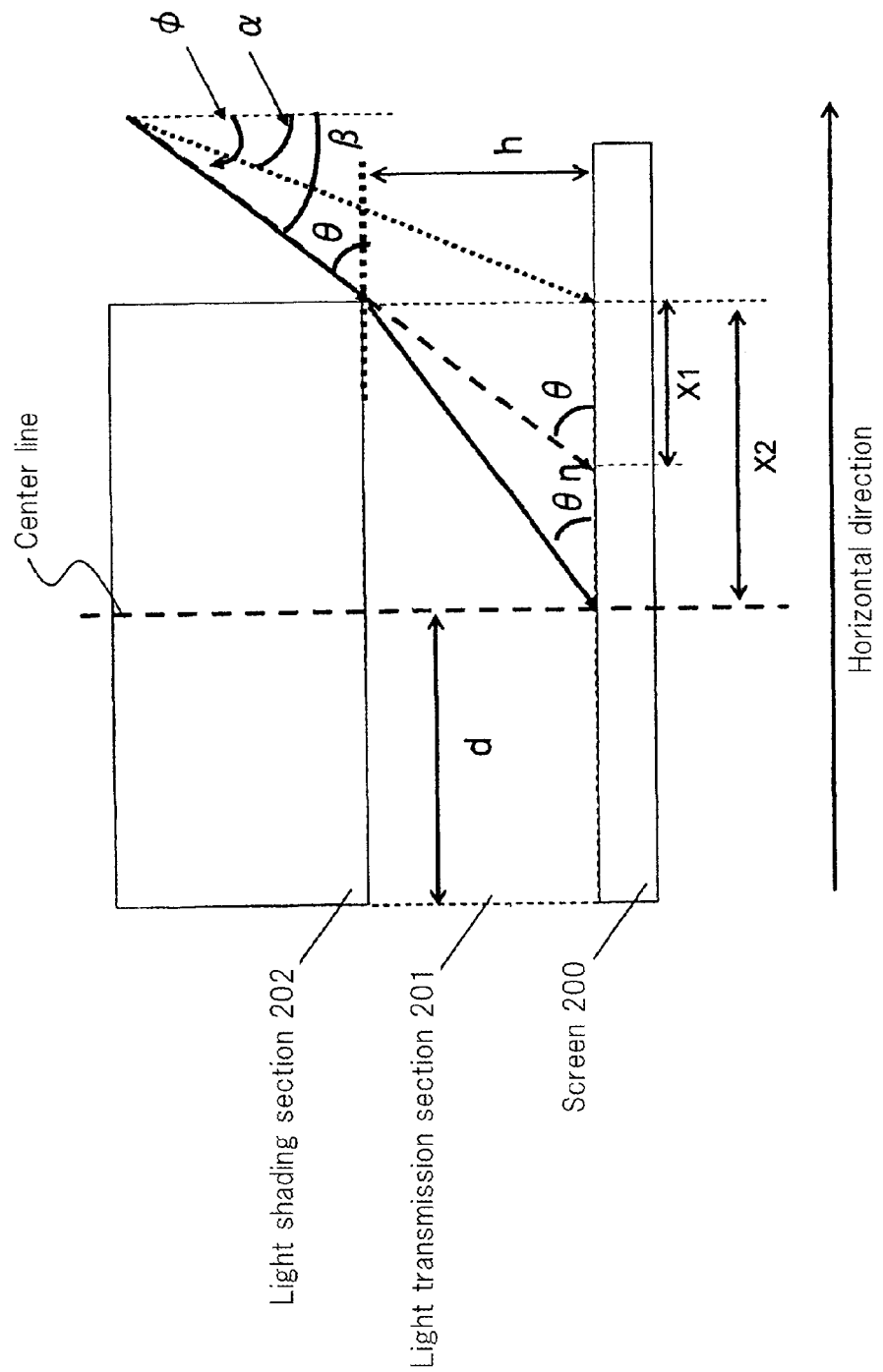
FIG. 12 is a schematic diagram describing a horizontal correction process.

FIG. 12 is a schematic diagram describing the horizontal correction process and is a side view showing the neighborhood of screen support member 200 located in the vertical direction of and on the screen.

As shown in FIG. 12, if horizontal scanning angle $\phi$ is included in a horizontal correction range that is an angle range from $\alpha$ to $\beta$, projection light is transmitted through light transmission section 201 of screen support member 200 and enters screen 100. If horizontal scanning angle $\phi$ is included in a horizontal non-correction range that is an angle range from 0° to $\alpha$, projection light directly enters screen 100 but not through light transmission section 201 of screen support member 200.

Angles $\alpha$ and $\beta$ are real numbers that satisfy $0°<\alpha<\beta<90°$. The horizontal correction range defined by angles $\alpha$ and $\beta$ depends on the location and shape of screen support member 200. More specifically, as shown in FIG. 4, assuming that the distance from scanning section 112 of projector 1 to screen 200 is denoted by H and the distance from scanning section 112 (more specifically, horizontal mirror section 112a) of projector 1 to light transmission section 201 is denoted by L, angle $\alpha$ can be represented by $\alpha$=a tan (L/H) and $\beta$ can be represented by $\beta$=a tan (L/(H−h)).

Correction section 122 determines whether or not horizontal scanning angle $\phi$ is included in the horizontal correction range. The horizontal correction range may be preset by the user or manufacturer of the projector. If projector 1 is provided with a sensor that can detect the location, size, shape of screen support member 200, and the relationship of the locations of projector 1 and screen 100, and so forth, correction section 122 itself may obtain the horizontal correction range based on the detected result of the sensor and use the horizontal correction range.

If horizontal scanning angle $\phi$ is included in the horizontal correction range, correction section 122 corrects the emission time of light emitted by each pixel based on refractive index n of light transmission section 201.

More specifically, first, correction section 122 obtains the amount of horizontal correction that is the amount of correction of the emission time. The amount of horizontal correction is represented by the ratio of "the horizontal distance in which the incident position of projection light on screen 100 moves from the side plane of light transmission section 201 to the center" X2 (=d) and "the horizontal distance in which the incident position of projection light on screen 100 moves from the side plane of light transmission section 201 when screen support member 200 is not present" X1. In other words, correction section 122 obtains the amount of horizontal correction f(n) using the following Formula 2.

$$f(n) = X2/X1 \quad \text{[Formula 2]}$$
$$= (h/\tan\theta n)/(h/\tan\theta)$$
$$= n \cdot \cos\theta n / \cos\theta$$
$$= n \cdot \cos\theta n / \sin\beta$$

where β is an angle that defines the horizontal correction range and is a horizontal scanning angle at which projection light enters the boundary of a projection region. θn is an incident angle of projection light to screen 100 in the case in which the incident angle of projection light to screen 100 is a critical incident angle and can be expressed by the following Formula 3.

$$\theta n = a\sin(1/n \cdot \sin\theta) = a\sin(1/n \cdot \cos\beta) \quad \text{[Formula 3]}$$

Thereafter, correction section 122 decreases the emission time represented by the light emission signal generated by drive section 121 by 1/f(n) times so as to decrease the emission time of light emitted by each pixel by 1/f(n) times.

Since the foregoing horizontal correction process corrects the emission time of light emitted by each pixel, the projection angle of projection light of each pixel is corrected and thereby the incident position of projection light on screen 100 is corrected.

Since the emission time is decreased by 1/f(n) times, it is likely that the amount of light emitted by each pixel decreases and thereby the image becomes dark. Thus, it is preferable that correction section 122 corrects the intensity of light by increasing the intensity of light represented by the light emission signal generated by drive section 121 by f(n) times such that the amount of light emitted by each pixel does not change.

Next, the vertical correction process will be described.

Figure 13:
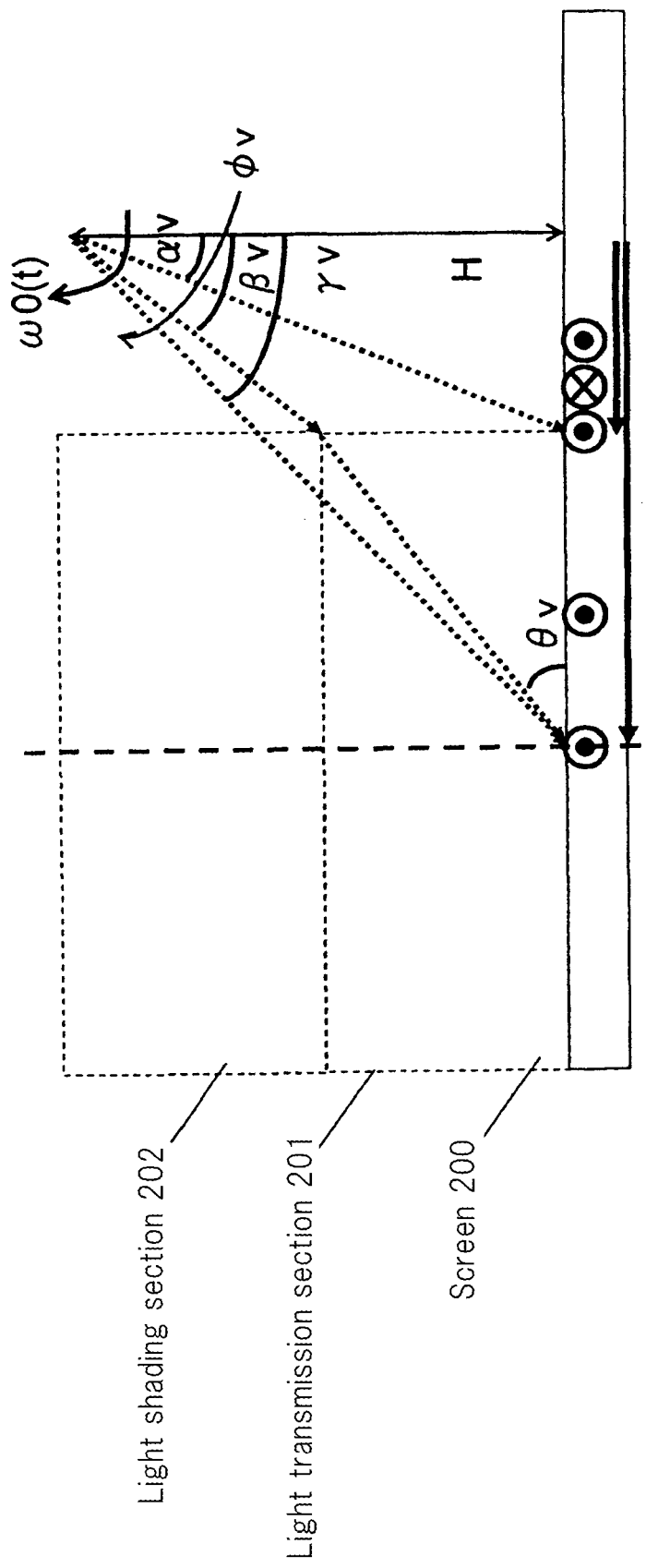
FIG. 13 is a schematic diagram describing a vertical correction process.

FIG. 13 is a schematic diagram describing the vertical correction process and is a side view showing the neighborhood of screen support member 200 located in the horizontal direction of and on the screen.

As shown in FIG. 13, if vertical scanning angle φv is included in a vertical correction range that is an angle range from αv to βv, projection light transmits through light transmission section 201 of screen support member 200 and enters screen 100. If vertical scanning angle φv is included in a vertical non-correction range that is an angle range from 0° to αv, projection light directly enters screen 100 but not through light transmission section 201 of screen support member 200.

Angles αv and βv are real numbers that satisfy 0°<αv<βv<90°. The vertical correction range defined by angles αv and βv depends on the location, size, and shape of screen support member 200 (more specifically, light transmission section 201), the relationship of locations of projector 1 and screen 100, and so forth.

Correction section 122 determines whether or not vertical scanning angle φv is included in the vertical correction range. The vertical correction range may be preset by the user or manufacturer of the projector. If projector 1 is provided with a sensor that can detect the location, size, shape of screen support member 200, and the relationship of the locations of projector 1 and screen 100, and so forth, correction section 122 itself may obtain the vertical correction range based on the detected result of the sensor and use the vertical correction range.

If vertical scanning angle φv is included in the vertical correction range, correction section 122 corrects the vertical mirror drive signal based on refractive index n of light transmission section 201.

More specifically, first, correction section 122 obtains the amount of vertical correction that is the amount of correction of the vertical scanning angular speed.

The amount of vertical correction is represented by the ratio of "the change of angle in which the vertical scanning angle changes from αv to βv" and "the change of angle in which the vertical scanning angle changes from αv to γv when projection light reaches the projection region in the case that screen support member 200 is not present." Namely, correction section 122 obtains the amount of vertical correction g(n) using the following Formula 4.

$$g(n) = (\beta v - \alpha v)/(\gamma v - \alpha v) = (a\cos(n \cdot \sin\theta v) - \alpha v)/(\gamma v - \alpha v) \quad \text{[Formula 4]}$$

where θv is an incident angle of projection light to screen 100 in the case in which the incident angle of projection light to light transmission section 201 is a critical incident angle and can be expressed by the following Formula 5 like Formula 2.

$$\theta v = a\sin(1/n \cdot \cos\beta v) \quad \text{[Formula 5]}$$

Thereafter, correction section 122 corrects the vertical mirror drive signal generated by drive section 121 such that the vertical scanning angular speed is increased by g(n) times.

The foregoing vertical correction process corrects the vertical scanning angular speed such that time in which the vertical scanning angle changes from αv to βv at post-corrected vertical scanning angular speed ω(t) becomes equal to time in which the vertical scanning angle changes from αv to γv at pre-corrected vertical scanning angular speed ω0(t) and thereby corrects the incident position of projection light on screen 100 as is clear from the following conditional formula (Formula 6, 7) in which time in which the vertical scanning angle changes from αv to βv at post-corrected vertical scanning angular speed ω(t) becomes equal to time in which the vertical scanning angle changes from αv to γv when projection light reaches the projection region in the case that screen support member 200 is not present.

$$(\beta v - \alpha v)/\omega(t) = (\gamma v - \alpha v)/\omega 0(t) \quad \text{[Formula 6]}$$

Namely, $$\omega(t) = ((\beta v - \alpha v)/(\gamma v - \alpha v))\omega 0(t) = g(n)\omega 0(t) \quad \text{[Formula 7]}$$

Next, the operation of projector 1 will be described.

Figure 14:
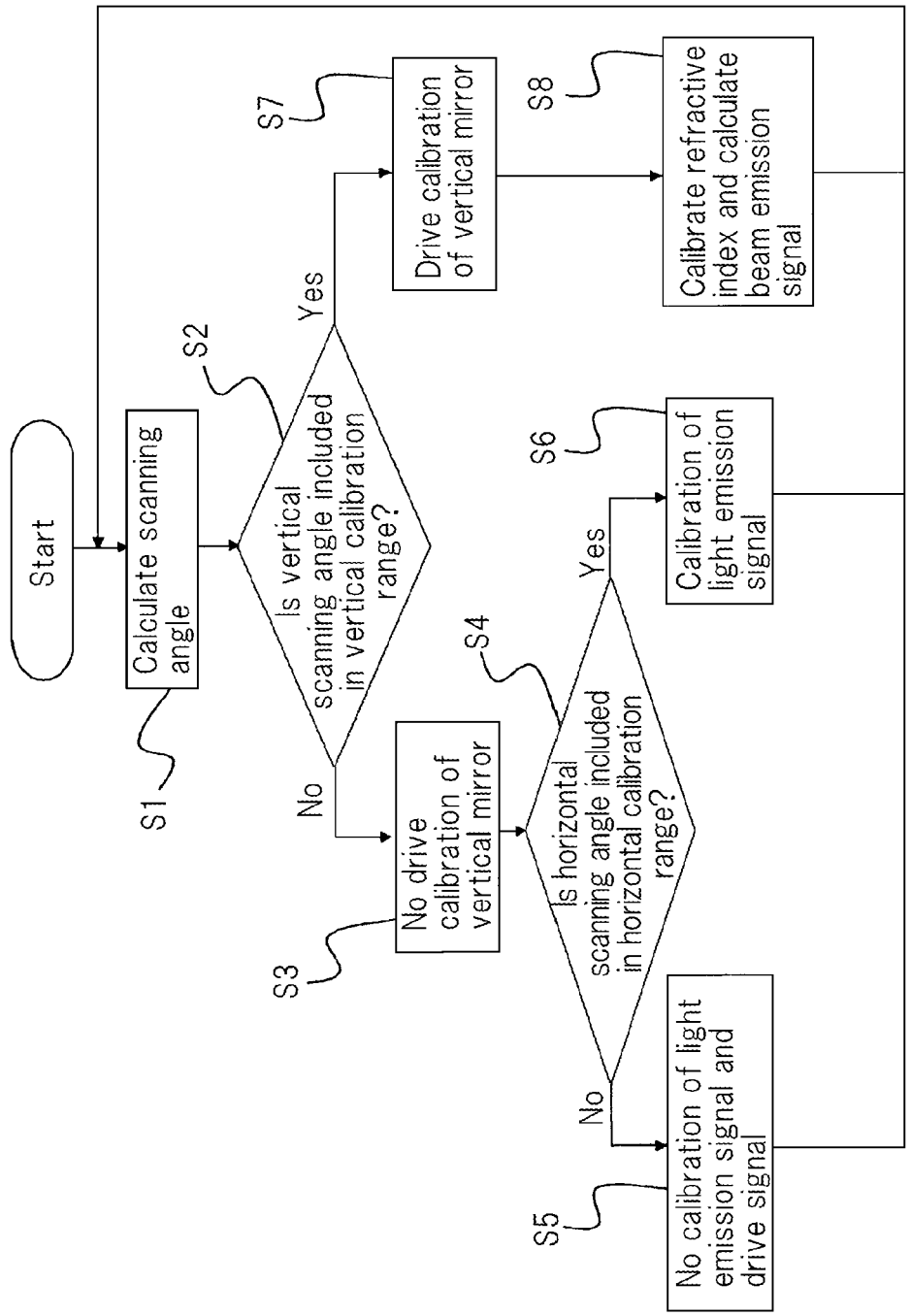
FIG. 14 is a flow chart describing an example of the operation of the projector.

FIG. 14 is a flow chart describing an example of the operation of projector 1.

At step S1, drive section 121 generates the light emission signal and drive signal based on an input image signal. In addition, drive section 121 calculates the horizontal scanning angle and vertical scanning angle of light emitted by each pixel corresponding to the light emission signal based on the image signal. Drive section 121 outputs an angle signal to correction section 122 that represents the horizontal scanning angle and the vertical scanning angle. When correction section 122 receives the angle signal, correction section 122 executes step S2.

At step S2, correction section 122 determines whether or not the vertical scanning angle represented by the angle signal is included in the vertical correction range. If the vertical scanning angle is not included in the vertical correction range, correction section 122 executes step S3. If the vertical scanning angle is included in the vertical correction range, correction section 122 executes step S7.

At step S3, correction section 122 determines that the vertical scanning angular speed does not need to be corrected and advances to step S4.

At step S4, correction section 122 determines whether or not the horizontal scanning angle represented by the angle signal is included in the horizontal correction range. If the horizontal scanning angle is not included in the horizontal correction range, correction section 122 executes step S5. If the horizontal scanning angle is included in the horizontal correction range, correction section 122 executes step S6.

At step S5, correction section 122 outputs a non-correction signal to drive section 121 that is a correction enable/disable signal that represents the unnecessity of correction. When drive section 121 receives the non-correction signal, drive section 121 outputs the light emission signal generated at step S1 to LD light emission section 111 and outputs the drive signal generated at step S1 to scanning section 112. Thereafter, drive section 121 returns to step S1.

When the light emission signal is input to LD light emission section 111, it emits emission light of each pixel corresponding to the light emission signal. When the horizontal mirror drive signal that is a drive signal is input to horizontal mirror section 112A of scanning section 112, horizontal mirror section 112A scans the light emitted by each pixel of LD light emission section 111 at a speed corresponding to the horizontal mirror drive signal and emits the scanned light. On the other hand, vertical mirror section 112B of scanning section 112 scans the emission light of each pixel of horizontal mirror section 112A and projects the scanned light to the rear plane of screen 100.

At step S6, correction section 122 calculates the amount of horizontal correction f(n) using Formula 2 and Formula 3 and outputs a correction signal that represents the amount of correction f(n) and the necessity of correction as a correction enable/disable signal that represents the necessity of correction to drive section 121. When drive section 121 receives the correction signal and determines that the correction signal represents the necessity of correction, drive section 121 increases the emission time represented by the light emission signal generated at step S1 by 1/f(n) times so as to increase the intensity of light represented by the light emission signal by f(n) times based on the amount of correction indicated by correction signal. Thereafter, drive section 121 inputs the corrected light emission signal to LD light emission section 111 and inputs the drive signal generated at step S1 to scanning section 112. Thereafter, drive section 121 returns to step S1.

Figure 15:
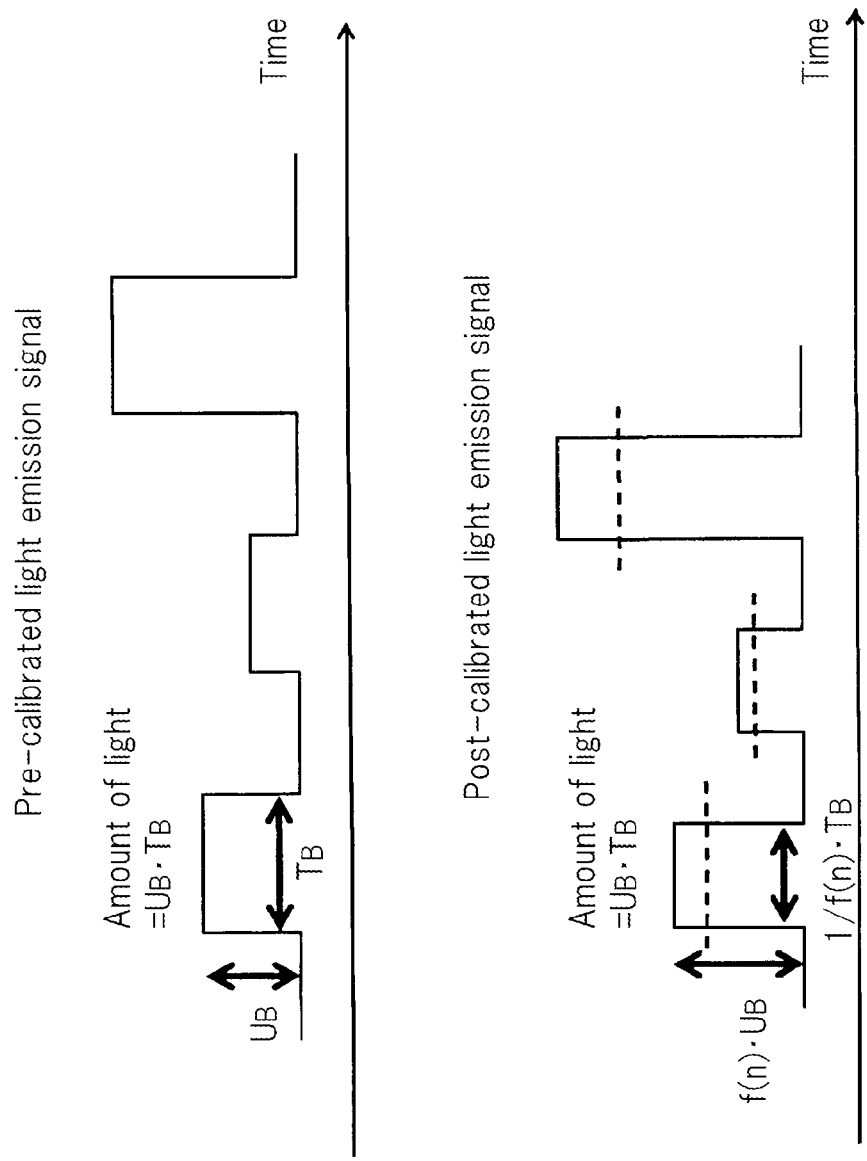
FIG. 15 is a schematic diagram comparing a pre-corrected light emission signal and a post-corrected light emission signal.

FIG. 15 is a schematic diagram that compares a pre-corrected light emission signal and a post-corrected light emission signal. In FIG. 1, it is assumed that screen 100 is a fluorescent screen. The light emission signal is composed of three pulse signals that represent light emission voltage command values corresponding to the amounts of projected light that enters red, blue, and green fluorescent bodies. The amplitude and width of a pulse signal represent an intensity of light and light emission time, respectively.

Assuming that the amplitude and width of the pre-corrected pulse signal are denoted by UB and TB, respectively, the amplitude and width of the post-corrected pulse signal are represented by UB·f(n) and TB/f(n), respectively.

Since the width of the pulse signal becomes TB/f(n), the position of projection light of each pixel on screen 100 is corrected and thereby projection light of each pixel enters the position that the projection light has to enter. In addition, since the amplitude of the pulse signal becomes UB·f(n), regardless of whether or not the pulse signal has been corrected, the amount of light represented by the pulse signal becomes UB·f(n).

Returning to the description of the operation of projector 1, at step S7, correction section 122 determines that the vertical scanning angular speed needs to be corrected and then advances to step S8.

At step S8, correction section 122 calculates the amount of vertical correction g(n) using Formula 4 and Formula 7 and outputs a correction signal that represents the amount of vertical correction g(n) and the necessity of correction of the drive signal as a correction enable/disable signal that represents the necessity of correction to drive section 121. When drive section 121 receives the correction signal and determines that the correction signal represents the necessity of correction, drive section 121 corrects the drive signal such that the vertical scanning angular speed is increased by g(n) times. Thereafter, drive section 121 inputs the light emission signal generated at step S1 to LD light emission section 111 and outputs the corrected drive signal to scanning section 112. Thereafter, drive section 121 returns to step S1.

Alternatively, instead of the angle signal, drive section 121 may output a flag signal that denotes whether or not the horizontal scanning angle is included in the horizontal correction range and whether or not the vertical scanning angle is included in the vertical correction range to correction section 122. In this case, correction section 122 determines whether or not the horizontal scanning angle is included in the horizontal correction range and whether or not the vertical scanning angle is included in the vertical correction range based on the flag signal. At this point, the horizontal correction range and the vertical correction range are set to drive section 121.

As described above, according to this embodiment, projection section 11 includes LD light emission section 111 and scanning section 112 that scans emission light of LD light emission section 111 and projects the scanned light to the rear plane of screen 100. Drive section 121 controls the amount of light emitted by LD light emission section 111 and the scanning angle of scanning section 112 based on the image signal such that projection section 11 projects an image corresponding to the image signal to screen 100. Correction section 122 corrects the projection angle of projection light corresponding to each pixel of the image projected from the projection section based on the refractive index of light transmission section 201 of screen support member 200 and the scanning angle of scanning section 112 so as to correct the incident position of the projection light of each pixel on screen 100.

In this case, the incident position of the projection light of each pixel on screen 100 is corrected based on the refractive index of light transmission section 201 and the scanning angle of scanning section 112. Thus, even if screen support member 200 is present, projection light can enter the same position as screen support member 200 is not present. Thus, distortion of the projection image due to deviation of incident positions of projection light to screen 100 can be suppressed.

Next, a second embodiment of the present invention will be described.

A projector according to the second embodiment is different from the projector according to the first embodiment in the structure of control section 12.

Figure 16:
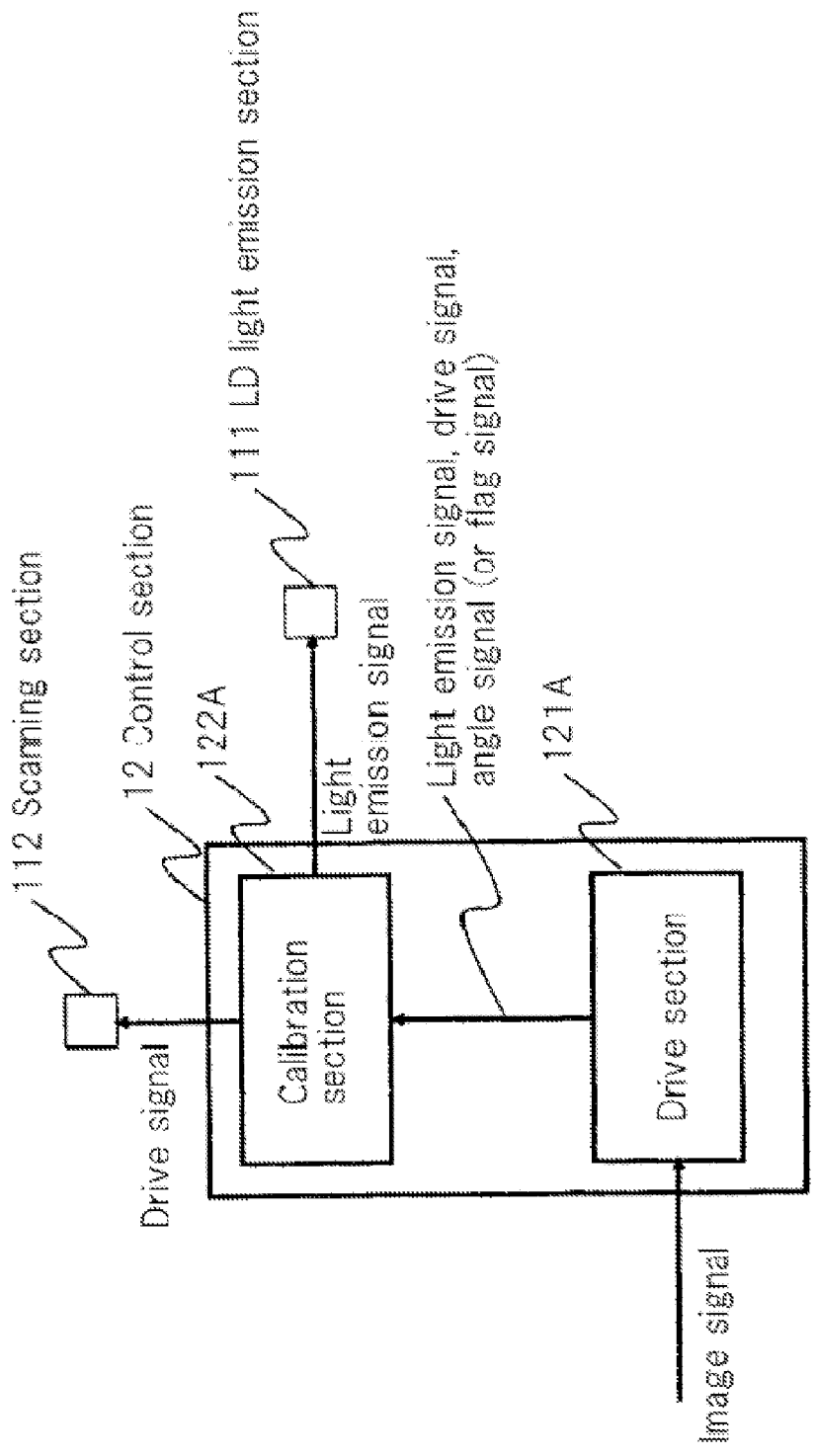
FIG. 16 is a block diagram showing another example of the structure of the control section.

FIG. 16 is a block diagram showing the structure of control section 12 according to the second embodiment. In FIG. 16, control section 12 includes drive section 121A and correction section 122A.

The basic functions of drive section 121A and correction section 122A are the same as those shown in FIG. 8 except for their operations.

Drive section 121A inputs the light emission signal and drive signal to LD light emission section 111 and scanning section 112 respectively through correction section 122A so as to control the amount of light emitted by LD light emission section 111 and the scanning angle of scanning section 112 based on the image signal.

More specifically, drive section 121 generates the light emission signal, drive signal, and angle signal based on the image signal and outputs the light emission signal, drive signal, and angle signal to correction section 122A.

When correction section 122A receives the light emission signal, drive signal, and angle signal, correction section 122A determines whether or not to correct the light emission signal or drive signal.

If correction section 122A determines to correct the light emission signal or drive signal, correction section 122A corrects the light emission signal or drive signal. Thereafter, correction section 122A inputs the corrected light emission signal and drive signal to LD light emission section 111 and scanning section 112, respectively. On the other hand, if correction section 122A determines not to correct the light emission signal and drive signal, correction section 122A inputs the light emission signal and drive signal without corrections to LD light emission section 111 and scanning section 112, respectively.

Drive section 121A performs a generation process for the light emission signal, drive signal, and angle signal in the same manner as drive section 121. Likewise, correction section 122A performs the correction determination process and correction process in the same manner as correction section 122. Alternatively, drive section 121A and correction section 122A may use a flag signal instead of the angle signal.

This embodiment can realize the same effect as that of the first embodiment.

Next, a third embodiment of the present invention will be described.

The third embodiment is different from the first and second embodiments in the shape of screen support member 200.

Figure 17:
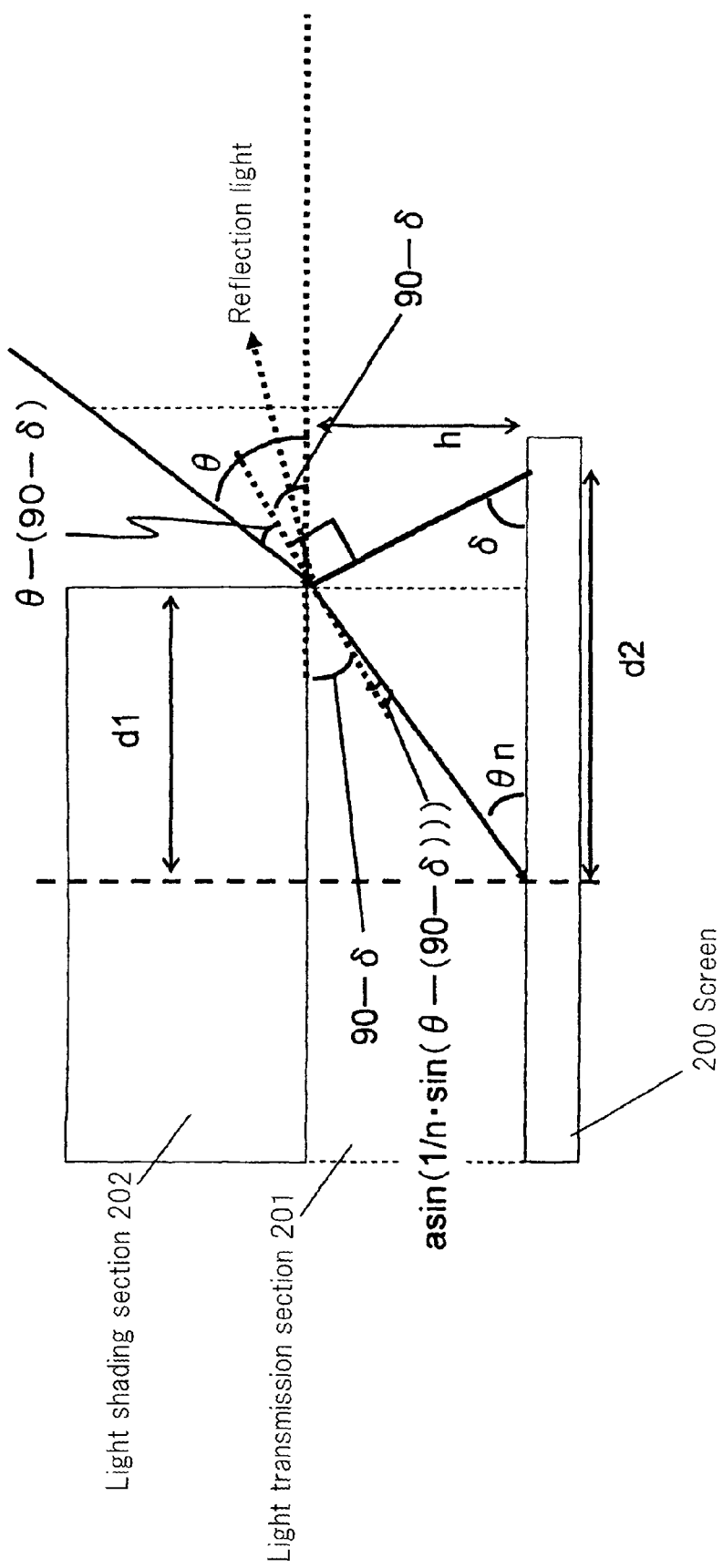
FIG. 17 is a schematic diagram showing another example of the screen support member.

FIG. 17 is a schematic diagram showing screen support member 200 according to the third embodiment and more specifically is a side view showing the neighborhood of screen support member 200 located in the vertical direction of and on screen 100.

In FIG. 17, light transmission section 201 of screen support member 200 has a taper structure. A side plane of light transmission section 201 has taper angle $\delta$ to the front plane of the screen. Light shading section 202 has the same structure as the first embodiment. It is assumed that the length of the lower plane of light transmission section 201 is denoted by $2d_2$ and the length of the upper plane of light transmission section 201 is denoted by $2d_1$.

Since light transmission section 201 has a taper structure, light transmission section 201 has an advantage over the non-taper structure in that it can prevent projection light reflected on the front plane of light transmission section 201 from entering the screen. As a result, distortion of an image can be further alleviated. In this case, taper angle $\delta$ is set such that reflected light travels at least in parallel with the screen. In other words, taper angle $\delta$ is set such that $\theta \geq 90 - \delta \geq \theta/2$ where $\theta$ is the foregoing auxiliary angle.

Height h of light transmission section 201 that allows projection light of projector 1 to be transmitted through light transmission section 201 and that reaches the boundary of the projection region, but does not enter a projection region of another projector can be expressed by the following Formula 8.

$$h = d_1 \cdot \tan(90° - \delta + a\sin(1/n \cdot \sin(\theta - (90° - \delta)))) \quad \text{[Formula 8]}$$

Length $d_2$ of the lower plane of light transmission section 201 can be expressed by the following Formula 9.

$$d_2 = d_1 + h \cdot \tan(90° - \delta) \quad \text{[Formula 9]]}$$

Next, amount of horizontal correction f(n) in the case in which light transmission section 201 has the taper structure will be described.

As described in the first embodiment, the amount of horizontal correction f(n) is represented by the ratio of "the horizontal distance X2 (=d) in which the incident position of projection light on screen 100 moves from the lower plane side of the side plane of light transmission section 201 to the center" and "the horizontal distance X1 in which the incident position of projection light on screen 100 moves from the lower plane side on the side plane of light transmission section 201 in the case in which screen support member 200 is not present". Thus, like the first embodiment, the amount of horizontal correction f(n) can be expressed by the following Formula 10.

[Formula 10]

$$\begin{aligned}
f(n) &= X2/X1 \\
&= \{h/\tan\theta n + h \cdot \tan(90° - \delta)\} / \{h/\tan\theta + h \cdot \tan(90° - \delta)\} \\
&= (\sin\theta/\sin\theta n) \cdot \{\cos(\theta n - (90° - \delta))/\cos(\theta - (90° - \delta))\} \\
&= (\sin\theta/\sin\theta n) \cdot \{\sin(\theta n + \delta)/\sin(\theta + \delta)\} \\
&= (\sin\theta/\sin\theta n) \cdot n \cdot \{\tan(\theta + \delta)/\tan(\theta n + \delta)\}
\end{aligned}$$

Incident angle $\theta n$ can be expressed using taper angle $\delta$ and refractive index n by the following Formula 11.

$$\theta n = 90° - \delta + a\sin(1/n \cdot \sin(\theta - (90° - \delta))) \quad \text{[Formula 11]}$$

Next, the amount of vertical correction will be described.

Regardless of whether or not light transmission section 201 has a taper structure, the conditional formula in which time during which the vertical scanning angle changes from $\alpha v$ to $\beta v$ at post-corrected vertical scanning angular speed $\omega(t)$ becomes equal to time in which the vertical scanning angle changes from $\alpha v$ to $\gamma v$ at pre-corrected vertical scanning angular speed $\omega 0(t)$. Thus, correction section 122 can obtain the amount of vertical correction using formula 4 and formula 7.

This embodiment can accomplish the same effect as the first embodiment. In addition, since distortion of an image due to reflected light by light transmission section 201 can be alleviated, distortion of a projection image can be further alleviated.

In the foregoing embodiments, the illustrated structures are just examples. Thus, it should be appreciated that the present invention is not limited to such structures.

The light source may be one that does not use an LD. For example, the light source may be one using a solid laser element. Alternatively, light shading section 202 may be omitted as long as the scanning angle is controlled such that projected light of projector 1 does not enter a projection region of another projector.

Alternatively, correction section 122 may obtain the amount of vertical correction g(n) using an approximate formula of Formula (4) instead of Formula (4) itself. Specifically, the amount of vertical correction g(n) can be represented by the ratio of "the vertical distance in which the incident position of projection light on screen 100 moves from the side plane of light transmission section 201 to the center" Xv2 (=d) and "the vertical distance in which the incident position of projection light on screen 100 moves from the side plane of light transmission section 201" Xv1 like the calculation for amount of horizontal correction f(n). In this case, since "distance Xv1" and "distance Xv2" can be approximated by Xv1~H·(βv−αv) and Xv2~H·(γv−αv), respectively, the amount of vertical correction g(n) can be approximated by the following Formula 12.

$$g(n)=(\gamma v-\alpha v)/(\beta v-\alpha v)\sim Xv1/Xv2 \quad \text{[Formula 12]}$$

Thus, correction section 122 may obtain the amount of vertical correction g(n) from the following approximate formula (Formula 13).

$$g(n)\sim Xv1/Xv2=\sin \beta v/(n\cdot\cos \theta n) \quad \text{[Formula 13]}$$

The present application claims a priority based on Japanese Patent Application JP 2010-080761 filed on Mar. 31, 2010, the entire contents of which are incorporated herein by reference in its entirety.

What is claimed is:

1. A projector that projects light to a rear plane side of a screen having a screen support member composed of a light transmission member located on the rear plane of the screen, comprising:
   a projection section that includes a light source and a scanning section that scans light emitted by said light source and projects the scanned light to said rear plane side of said screen;
   a drive section that controls an amount of light emission of said light and a scanning angle of said scanning section based on an image signal so as to cause said projection section to project an image corresponding to said image signal to said screen; and
   a correction section that corrects an orientation of projection light corresponding to each pixel of said image projected from said projection section based on a refractive index of said light transmission member and the scanning angle of said scanning section so as to correct an incident position of the projection light on said screen.

2. The projector as set forth in claim 1,
   wherein said scanning section scans said light emission in a first scanning direction and a second scanning direction that are different from each other,
   wherein said drive section controls said scanning angle such that said scanning section scans said light emission for each line of said image along said first scanning direction, and
   wherein said correction section corrects an emission time for light emission said light source corresponding to each pixel of said image based on said refractive index and a first scanning angle that is a scanning angle in said first scanning direction of said scanning section.

3. The projector as set forth in claim 2,
   wherein said correction section determines whether or not said first scanning angle is included in a first correction range that is set based on a location and a shape of said screen support member and if said first scanning angle is included in said first correction range, said correction section corrects said emission time based on said refractive index.

4. The projector as set forth in claim 2,
   wherein said correction section corrects an intensity of projection light of said light source based on the amount of correction of said emission time such that the amount of light emission corresponding to each pixel of said image does not change.

5. The projector as set forth in claim 1,
   wherein said scanning section scans said light emission in a first scanning direction and a second scanning direction that are different from each other,
   wherein said drive section controls said scanning angle such that said scanning section scans said light emission for each line of said image along said first scanning direction, and
   wherein said correction section corrects a scanning angular speed in said second scanning direction based on said refractive index and a second scanning angle that is a scanning angle in said second scanning direction of said scanning section so as to correct the orientation of said projection light.

6. The projector as set forth in claim 5,
   wherein said correction section determines whether or not said second scanning angle is included in a second correction range that is set based on a location and a shape of said screen support member and if said second scanning angle is included in said second correction range, said correction section corrects said scanning angular speed based on said refractive index.

7. A projector system, comprising:
   a plurality of projectors as set forth in claim 1,
   wherein the projectors are arranged such that projection images of the projectors are arranged and displayed in an array on said screen.

8. An image correcting method using a projector that has a projection section including a light source and a scanning section that scans light emitted by said light source and projects the scanned light to a rear plane side of a screen having a screen support member composed of a light transmission member located on the rear plane of the screen, comprising:
   controlling an amount of light emission of said light and a scanning angle of said scanning section based on an image signal so as to cause said projection section to project an image corresponding to said image signal to said screen; and
   calibrating an orientation of projection light corresponding to each pixel of said image projected from said projection section based on the refractive index of said light transmission member and the scanning angle of said scanning section so as to correct an incident position of the projection light on said screen.

* * * * *